US012703900B2

(12) United States Patent
Eso et al.

(10) Patent No.: US 12,703,900 B2
(45) Date of Patent: Aug. 11, 2026

(54) SOLID SOLUTION TUNGSTEN CARBIDE POWDERS AND APPLICATIONS THEREOF

(71) Applicant: KENNAMETAL INC., Latrobe, PA (US)

(72) Inventors: Oladapo O. Eso, Madison, AL (US); Amanda Brown, Madison, AL (US)

(73) Assignee: KENNAMETAL INC., Latrobe, PA (US)

( * ) Notice: Subject to any disclaimer, the term of this patent is extended or adjusted under 35 U.S.C. 154(b) by 455 days.

(21) Appl. No.: 18/222,730

(22) Filed: Jul. 17, 2023

(65) Prior Publication Data

US 2025/0027189 A1 Jan. 23, 2025

(51) Int. Cl.

*C22C 29/08* (2006.01)
*C22C 1/055* (2023.01)
*C22C 29/06* (2006.01)
*H01M 50/191* (2021.01)

(52) U.S. Cl.

CPC .............. *C22C 29/08* (2013.01); *C22C 1/055* (2013.01); *C22C 29/067* (2013.01); *H01M 50/191* (2021.01)

(58) Field of Classification Search

CPC ......... C22C 29/08; C22C 1/055; C22C 1/051; C22C 29/067; C22C 29/02; H01M 50/191; B22F 1/12; C01B 32/914; C01B 32/949; C01P 2002/72; C01P 2004/80

See application file for complete search history.

(56) References Cited

U.S. PATENT DOCUMENTS 6,852,304 B2 * 2/2005 Yaginuma ............ C01B 32/949 423/440
2004/0079191 A1 * 4/2004 Kobayashi ............. C22C 29/08 75/242
2015/0017430 A1 1/2015 Matthaeus
2022/0144708 A1 5/2022 Michiuchi et al.

FOREIGN PATENT DOCUMENTS

CN 106219547 A 12/2016
JP H10212165 A 8/1998
JP 2009242181 A 10/2009

* cited by examiner

*Primary Examiner* — Alexandra M Moore
(74) *Attorney, Agent, or Firm* — Christopher J. Owens

(57) ABSTRACT

An improved tungsten carbide powder comprises (W,Cr)C solid solution phase for oxidation resistance at high temperatures. The improved tungsten carbide powders may be formed by carburizing a mixture of tungsten powder, carbon powder, and $Cr_2O_3$ powder. The tungsten carbide powder herein may be used to form ready-to-press (RTP) or grade powders. These RTP may be used to form articles, including articles that require excellent oxidation resistance at high temperature. One such component is a seal ring for a liquid battery.

6 Claims, 13 Drawing Sheets

XRD of oxidized CSM2 powder (850°C for 24 hours).

SOLID SOLUTION TUNGSTEN CARBIDE POWDERS AND APPLICATIONS THEREOF

FIELD

The present invention relates to tungsten carbide powders and, in particular, to tungsten carbide powders comprising (W,Cr)C solid solutions.

BACKGROUND

Properties of metal carbide compositions have long been investigated. Cutting tool manufacturers, for example, have examined compositional changes to carbide compositions and the resulting effects on cemented carbide properties including, but not limited to, hardness, wear resistance, thermal deformation resistance, toughness and density. Enhancement of one carbide property, however, often results in the concomitant deterioration of another cemented carbide property. For example, increasing cemented carbide deformation resistance can result in decreased toughness and thermal conductivity. Nevertheless, improvements to carbide bodies are necessary to meet the evolving demands of metal working and other industrial applications, and a careful balance between competing properties is required when making compositional changes to carbide compositions in efforts to provide articles with improved performance.

SUMMARY

In one aspect, tungsten carbide compositions exhibiting enhanced oxidation resistance are described herein. In some embodiments, a tungsten carbide powder comprises a (W,Cr)C solid solution phase. As detailed further herein, the incorporation of chromium (Cr) in the tungsten carbide (WC) lattice can improve oxidation resistance of WC, including high temperature oxidation resistance in air. Amounts of chromium in the (W,Cr)C powder, in some embodiments, may be at least 1 wt. %, at least 5 wt. %, or at least 10 wt. %.

The tungsten carbide powder can be formed by carburizing a mixture that includes tungsten powder, carbon powder, and a chromium powder component. In some embodiments, the chromium component is a chromium oxide, such as $Cr_2O_3$. The powder mixture, for example, that is carburized may comprise 1 wt. % or more $Cr_2O_3$, 5 wt. % or more $Cr_2O_3$, or 10 wt. % or more $Cr_2O_3$.

In another aspect, ready-to-press (RTP) powders comprising the solid solution tungsten carbide powder (W,Cr)C are described. In addition to the solid solution tungsten carbide powder (W,Cr)C, the RTP powder comprises metallic binder, and one or more optional additives. The metallic binder may be iron (Fe), cobalt (Co), nickel (Ni), or alloys thereof in embodiments where the RTP powder comprises one or more additives. The one or more additives may be selected from vanadium carbide (VC), chromium carbide ($Cr_3C_2$), rhenium (Re), ruthenium (Ru), molybdenum carbide ($Mo_2C$), and combinations thereof. In some embodiments, the one or more additives may include a grain growth inhibitor.

In another aspect, articles made from RTP powders disclosed herein are provided. The article may be a seal for a liquid battery or other article subject to oxidative environments.

A liquid battery comprising a seal made from the RTP powders disclosed herein is also described.

In another aspect, manufacturing methods are provided. A manufacturing method, in some embodiments, may have one or more of the following steps. For example, the manufacturing method may comprise a step of carburizing a mixture of tungsten powder, carbon powder, and chromium component to form a tungsten carbide powder comprising a (W,Cr)C solid-solution phase. In some embodiments, the chromium component is a chromium oxide, such as $Cr_2O_3$. The powder mixture for carburization may comprise at least 1 wt. % $Cr_2O_3$, at least 5 wt. % $Cr_2O_3$, or at least 10 wt. % $Cr_2O_3$, in some embodiments. Another step of the manufacturing method may comprise forming a ready-to-press (RTP) powder from the solid solution phase tungsten carbide powder. The RTP powder may be used to form a cemented carbide component.

These and other embodiments are described further in the detailed description which follows.

DETAILED DESCRIPTION

Figure 1:
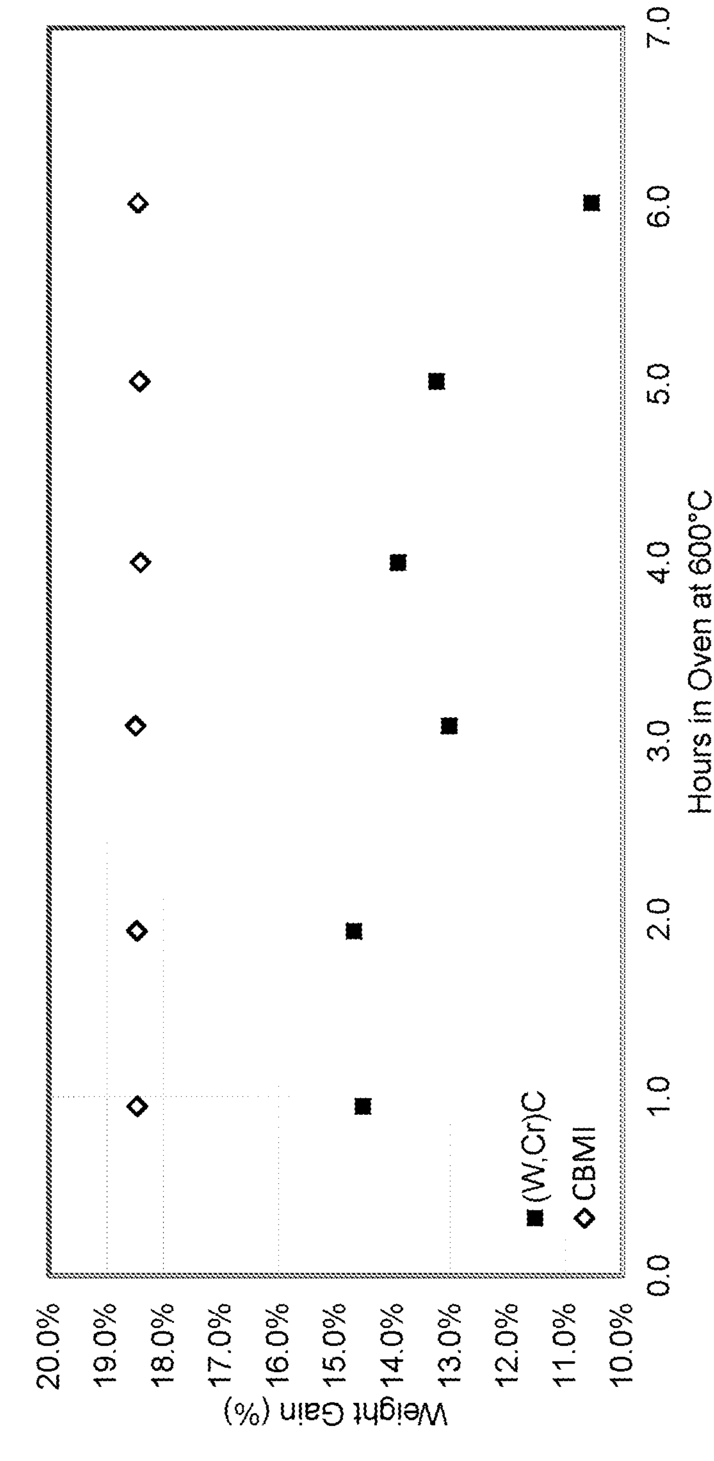
FIG. 1 is a graph showing weight gain (%) over a period of 6 hours in a 600° C. oven for certain embodiments described herein. CSM1 compared to CBM1.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

Solid Solution Tungsten Carbide Powder

Tungsten carbide powders described herein comprise a (W,Cr)C solid solution phase. As understood by those skilled in the art, a solid solution is a mixture of two crystalline solids that coexist as a new crystalline solid, or crystal lattice. The word "solution" is used to describe the intimate mixing of components at the atomic level and is distinguished from physical mixtures of components. Amounts of chromium in the solid solution tungsten carbide powder (W,Cr)C may be 1 wt. % or more, 5 wt. % or more, or 10 wt. % or more. Amounts of 11 wt. %, 12 wt. %, 13 wt. %, 14 wt. %, 15 wt. %, 16 wt. %, 17 wt. %, 18 wt. %, 19 wt. %, or 20 wt. % may be particularly preferred. Carbon content of the tungsten carbide powder may be between 5 wt. % and 15 wt. %, in some embodiments.

The tungsten carbide powder may be formed by carburizing a mixture comprising, consisting of, or consisting essentially of black mix and chromium oxide, such as $Cr_2O_3$. Typically, black mix comprises, consist of, or consist essentially of tungsten powder and carbon powders. In some embodiments, black mix may further comprise, consist of, or consist essentially of $Cr_2O_3$ in an amount that is less than about 1 wt. % of the black mix. The mixture that is carburized (black mix+$Cr_2O_3$) may comprise 1 wt. % or more $Cr_2O_3$, 5 wt. % or more $Cr_2O_3$, or 10 wt. % or more $Cr_2O_3$. A maximum amount of $Cr_2O_3$ is about 20 wt. %, in some embodiments. Amounts of $Cr_2O_3$ that are above 1 wt. %, preferably above 5 wt. %, and most preferably above 10 wt. % are believed to be necessary to impart the desired oxidation resistance to the resulting solid solution tungsten carbide powder. While $Cr_2O_3$ is employed in the examples herein, it is contemplated that other chromium oxides may be used to provide the (W,Cr)C solid solution powder.

Amounts of carbon in the mixture that is carburized may be from about 1 wt. % to about 15 wt. %, from about 2 wt. % to about 10 wt. %, from about 3 wt. % to about 10 wt. %, from about 4 wt. % to about 10 wt. %, from about 5 wt. % to about 10 wt. %, from about 6 wt. % to about 10 wt. %, from about 7 wt. % to about 10 wt. %, from about 8 wt. % to about 10 wt. %, or from about 9 wt. % to about 10 wt. %.

As understood by those skilled in the art, carburization is a process by which tungsten metal powder is converted to tungsten carbide by reaction with carbon powder in a furnace. Suitable carburization conditions are not so limited. Typical carburization temperatures may be between about 1300° C. and 2650° C. Carburization is typically performed in a hydrogen atmosphere.

Ready-to-Press or Grade Powders

A ready-to-press (RTP) or grade powder is also disclosed herein. The RTP powder may comprise, consist of, or consist essentially of the following components: (1) the solid solution (W,Cr)C powder as disclosed above, (2) a metallic binder, and (3) one or more optional additives. Composition of the RTP powder can be varied to provide a straight grade, a corrosion resistant grade, or a thermally resistant grade.

The metallic binder is not so limited, and can include Fe, Co, Ni, or alloys thereof. Metallic binder can be present in the RTP powder in any desired amount. In some embodiments, metallic binder is present in an amount of 3-15 wt. % or 6-10 weight percent of the powder composition. In some preferred embodiments, the RTP or graded powder may comprise about 6% nickel binder.

The one or more optional additives are also not so limited. The one or more additives may be selected from VC, $Cr_3C_2$, Re, Ru, $Mo_2C$, and combinations thereof. In some embodiments, the one or more additives may include one or more grain growth inhibitors. The grain growth inhibitor, as understood by those skilled in the art is used to control grain growth during thermal processing and densification of RTP powders. Examples of suitable grain growth inhibitors include, but are not limited to VC, $Cr_3C_2$, niobium carbide (NbC), tantalum carbide (TaC), $Mo_2C$, titanium carbide (TiC), and tantalum niobium carbide (TaNbC). An amount of the grain growth inhibitor may be from about 0.1 to 5 wt. %. of the powder composition. Optional components, including other metal carbide species, are added after formation of the solid solution powder (W,Cr)C. Therefore, such optional components, when present, are mixed with the solid solution powder (W,Cr)C to complete the RTP powder.

In some embodiments, the solid solution powder (W,Cr)C is 70 to 97 weight percent of the RTP powder, and grain size of the (W,Cr)C grains may be in the range of 0.4 and 10 micrometers, in some embodiments. Components of the RTP powder may be milled, spray dried, and/or sieved to form the final RTP powder.

Cemented Carbide Articles

Figure 13:
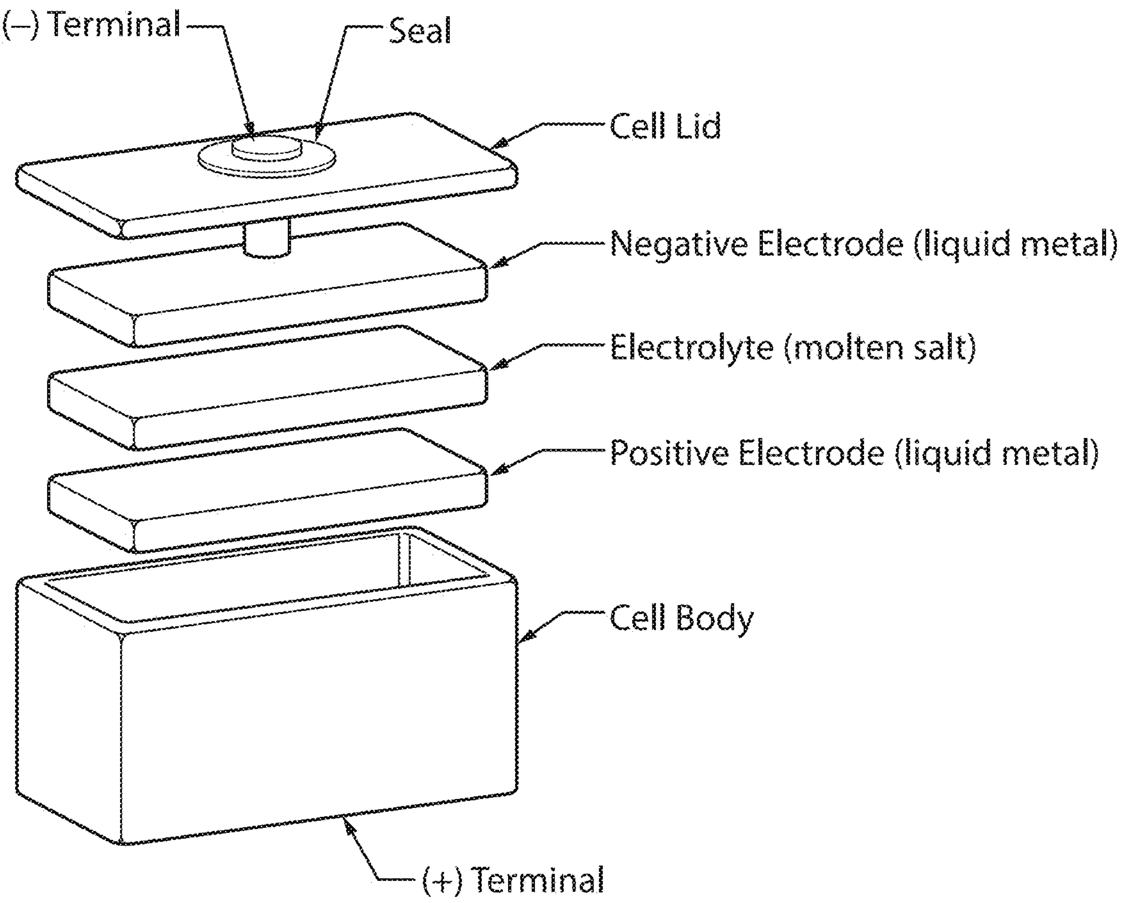
FIG. 13 is a schematic drawing of an exemplary liquid battery.

RTP powders may be used in the production of various cemented carbide articles including tools, wear parts, battery components, and other industrial articles. Particularly, the articles formed may be used in environments where oxidation resistance at high temperatures (e.g., up to 500° C. is desired. One example of such a component is a seal ring for a liquid battery. As understood by those skilled in the art, liquid batteries are different compared to other types of batteries. For example, their electrodes typically comprise molten metals, and the electrolyte that conducts current between them is typically a molten salt. An exemplary liquid battery cell is shown in FIG. 13 herein.

Negative electrode materials may include one or more selected from Li, Na, Mg, K, Ca. Rb, Sr, Cs, and Ba. In some preferred embodiments, the negative electrode may comprise Ca. Positive electrode materials may include one or more selected from Zn, Ga, Cd, In, Sn, Sb, Te, Hg, Hg, Tl, Pb, and Bi. In some preferred embodiments, the positive electrode may comprise Sb.

Manufacturing Methods

Methods of manufacturing the (W,Cr)C solid solution powders and associated RTP powders are also provided herein.

In one aspect, a method of making (W,Cr)C solid solution powder comprises, consists of, or consists essentially of mixing carbon powder and tungsten powder with chromium oxide powder, such as $Cr_2O_3$ powder, to form a powder mixture. Mixing may be achieved using ball mills, attritors, or specialized blenders. For example, a blender that allows for rotational, translational, and/or inversion throughout the mixing process. Moreover, mixing of the various powders can administered at room temperature and for a sufficient time period to achieve a uniform or substantially uniform distribution of the mixture components. Mixing times, for example may vary from about two hours to about twenty-four hours. In a preferred embodiment, the resulting mixed powder comprise more than 1 wt. % $Cr_2O_3$, more than 5 wt. % $Cr_2O_3$, or more preferably more than 10 wt. % $Cr_2O_3$.

The resultant powder mixture (including carbon powder, tungsten powder, and $Cr_2O_3$ powder) is carburized to form the (W,Cr)C solid solution powder. Carburization is a process by which tungsten metal powder is converted to tungsten carbide by reaction with carbon powder in a furnace. Suitable carburization conditions are not so limited. Typical carburization temperatures may be between about 1300° C. and 2650° C. Carburization is typically performed in a hydrogen atmosphere.

In another aspect, the solid solution (W,Cr)C powder is combined with powder metallic binder and optional additives to produce the RTP or grade powders described herein. Established milling and spray drying processes can be employed to make RTP powders for use in cemented carbide article manufacture. For example, a slurry of the tungsten carbide powder, a metal binder, an inhibitor, and a solvent may be milled. The solvent is not so limited and may be water or an organic liquid such as heptane or acetone. After milling, the solvent is removed by drying using a spray dryer or a vacuum dryer. In a spray-drying process commonly used in the cemented carbide industry, a hot inert gas such as nitrogen, impinges on a stream of carbide particles. In preferred embodiments, a solid lubricant such as a paraffin wax is added to the powder at the end of the milling process or later.

In a further aspect, the RTP or grade powders described herein are used to form a cemented carbide article. The RTP can be consolidated into the desired green article shape and subsequently sintered. Known shaping techniques include, but are not limited to, pill pressing, uniaxial pressing, cold isotactic pressing, injection molding, extrusion, and/or additive manufacturing. Alternatively, the RTP powder can be deposited and sintered in a layer-by-layer process, such as in additive manufacturing techniques including selective laser sintering, selective laser melting, or electron-beam melting. Post-sintering operations may also be performed after pressureless or pressure-assisted sintering (sinter-HIP). These include but are not limited to hot isotactic pressing and post-sinter forming.

These and other embodiments are further illustrated in the following non-limiting examples.

EXAMPLES

Black Mixes were co-carburized with $Cr_2O_3$ powder and carbon powder to form (W,Cr)C solid solution powder.

The composition of the Black Mixes were as follows:

Black Mix 1 (BM1)—93.223 wt. % W, 6.19 wt. % C, 0.587 wt. % $Cr_2O_3$.

Black Mix 2 (BM2)—93.316 wt. % W, 6.18 wt. % C, 0.504 wt. % $Cr_2O_3$.

Black Mix 3 (BM3)—93.223 wt. % W, 6.19 wt. % C, 0.587 wt. % Cr2O3

Black Mix 4 (BM4)—93.223 wt. % W, 6.19 wt. % C, 0.587 wt. % Cr2O3

Sample Mixes were formed from the Black Mixes:

Sample Mix 1 (SM1): Sample Mix 1 was formed by mixing 14.9119 kg of Black Mix 1 (BM1) with 2.9985 kg of $Cr_2O_3$ to form a mixed powder calculated to have weight percentages of 77.62% W, 5.15% Carbon, and 17.23% $Cr_2O_3$. Mixing was performed in batches using a Turbula® blender for 1 hour per batch. Mixing was performed at room temperature.

Sample Mix 2 (SM2): Sample Mix 2 was formed by mixing 14.8726 kg of Black Mix 2 (BM2) with 2.8861 kg $Cr_2O_3$, and 1.478 kg C to form a mixed powder calculated to have weight percentages of 72.17% W, 15.4% $Cr_2O_3$, and 12.44% C. Mixing was performed in batches using a Turbula® blender for 1 hour per batch. Mixing was performed at room temperature.

Sample Mix 3 (SM3)—Sample Mix 3 was formed using Black Mix 3 (BM3). A mixed powder calculated to have weight percentages of 72.92 W, 15.26% $Cr_2O_3$, and 11.82% C was formed. Mixing was performed in batches using a Turbula® blender for 1 hour per batch. Mixing was performed at room temperature.

Sample Mix 4 (SM4)—Sample Mix 4 was formed using Black Mix 4 (BM4). A mixed powder calculated to have weight percentages of 83.38% W, 7.10% $Cr_2O_3$, and 9.52% C was formed. Mixing was performed in batches using a Turbula® blender for 1 hour per batch. Mixing was performed at room temperature.

Mix components for Black Mixes (BM1, BM2, BM3, and BM4) and Sample Mixes (SM1, SM2, SM3, and SM4) are also shown in tabular format in Table 1 below:

TABLE 1

| | SM1 | BM1 | SM2 | BM2 | SM3 | BM3 | SM4 | BM4 |
|---|---|---|---|---|---|---|---|---|
| W(wt. %) | 77.62 | 93.223 | 72.17 | 93.316 | 72.92 | 93.223 | 83.38 | 93.223 |
| $Cr_2O_3$ (wt. %) | 17.23 | 0.587 | 15.4 | 0.504 | 15.26 | 0.587 | 7.10 | 0.587 |
| C (wt. %) | 5.15 | 6.19 | 12.44 | 6.18 | 11.82 | 6.19 | 9.52 | 6.19 |

Sample Mix 1 (SM1), Sample Mix 2 (SM2), Sample Mix 3 (SM3), and Sample Mix 4 (SM4) were then carburized in a hydrogen atmosphere to form Carburized Sample Mix 1 (CSM1), Carburized Sample Mix 2 (CSM2), Carburized Sample Mix 3 (CSM3), and Carburized Sample Mix 4 (CSM4). Carburization results in formation of a solid solution phase (W,Cr)C, in which chromium (Cr) has been incorporated into the crystal structure of tungsten carbide (WC).

Figure 9:
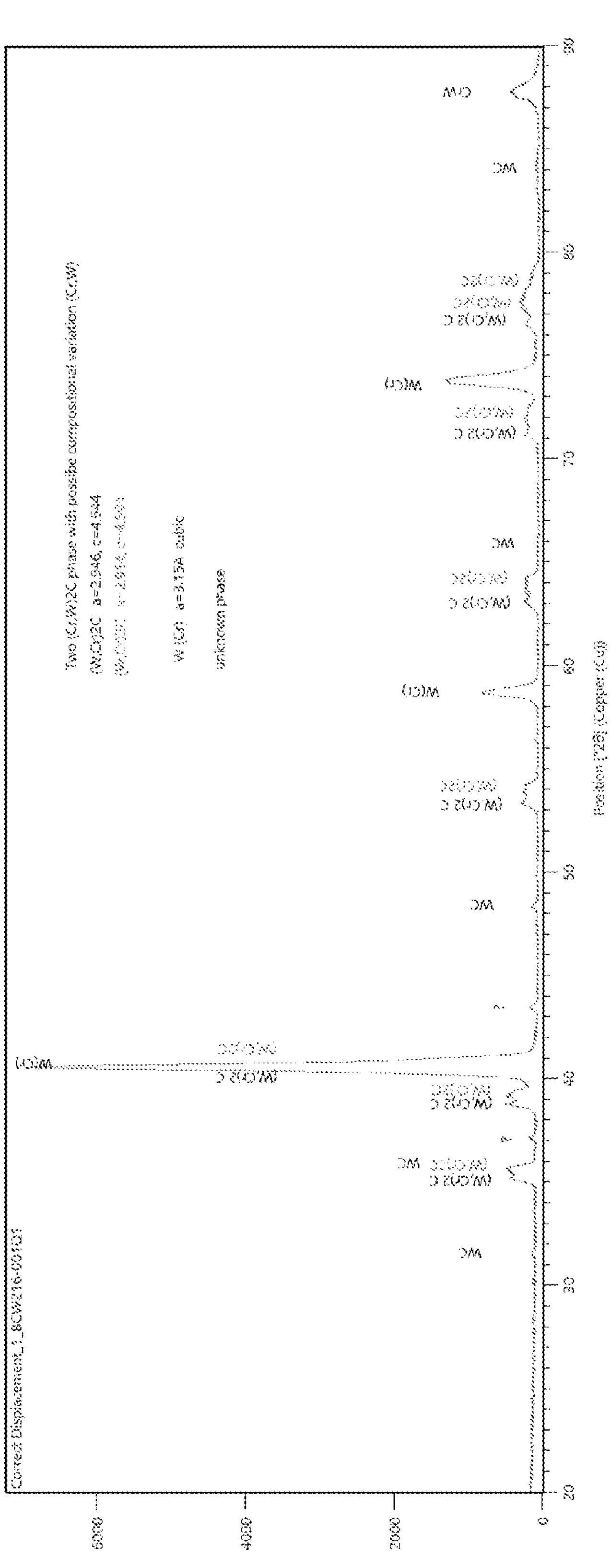
FIG. 9 is an XRD spectrum of CSM1 powder.

Carburized Sample Mix 1 (CSM1) was tested, and found to contain 1.87% carbon, 11.03% chromium, and 0.234% oxygen, and remainder tungsten. An XRD spectrum of CSM1 powder is found in FIG. 9. Reported Cr levels were tested at NSL Analytical.

Figure 10:
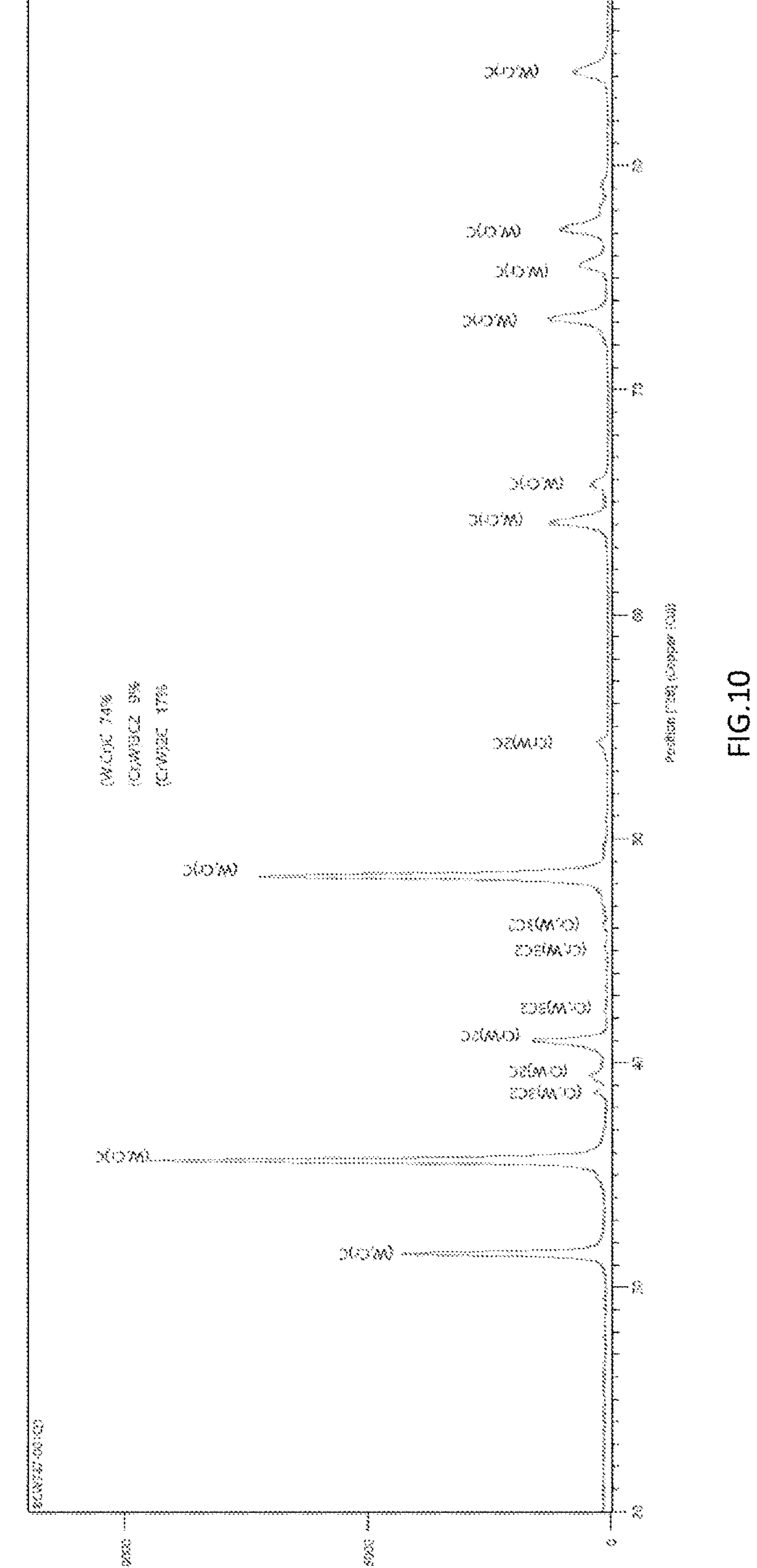
FIG. 10 is an XRD spectrum of CSM2 powder.
Figure 11:
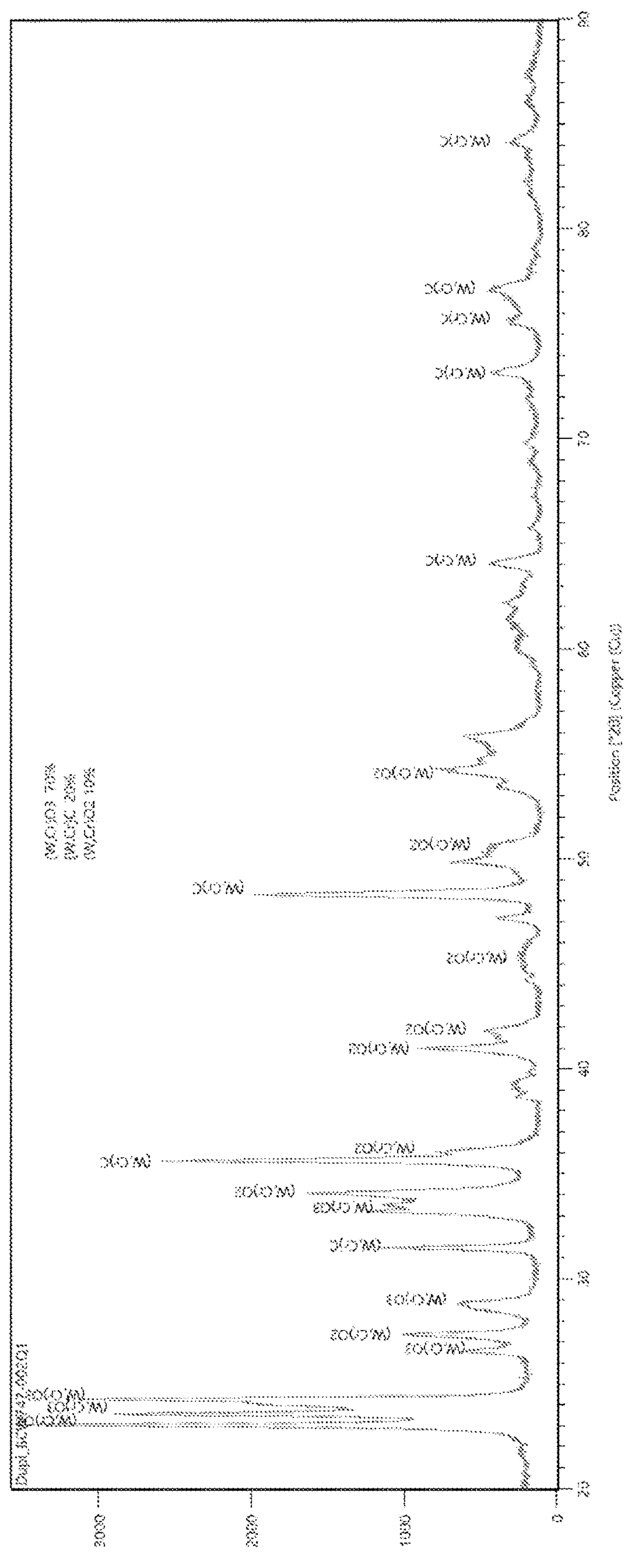
FIG. 11 is an XRD spectrum of oxidized CSM2 powder (850° C. for 24 hrs).

Carburized Sample Mix 2 (CSM2) was tested, and found to have 9.37% carbon, 11.94% chromium, 0.0358% oxygen, and remainder tungsten. An XRD spectrum of CSM2 powder is found in FIG. 10. Reported Cr levels were tested at NSL Analytical.

Carburized Sample Mix 3 (CSM3) was tested, and found to have 9.57% carbon, 9.99% chromium, and 0.0591% oxygen, and remainder tungsten. Reported Cr levels were tested at NSL Analytical.

Figure 12:
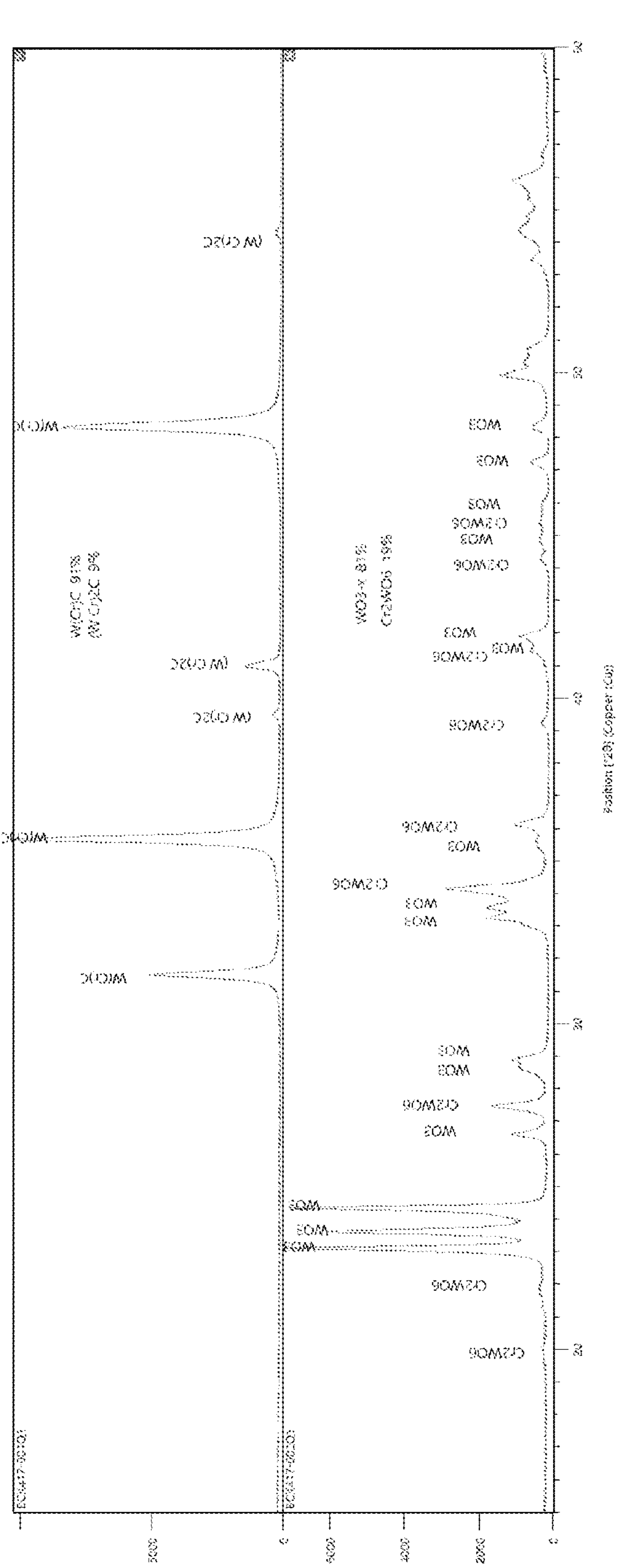
FIG. 12 includes an XRD spectrum of CSM4 powder and oxidized CSM4 powder (850° C. for 24 hrs).

Carburized Sample Mix 4 (CSM4) was tested, and found to have 7.81% carbon, 5.00% chromium, and 0.0684% oxygen, and remainder tungsten. An XRD spectrum of CSM4 is found in FIG. 12. Reported Cr levels were tested at NSL Analytical.

Black Mixes (BM1, BM2, BM3, BM4) were also carburized to form Carburized Black Mixes (CBM1, CBM2, CBM3, and CBM4).

A comparison of the analyzed chemistry for the Carburized Sample Mixes (CSM1, CSM2, CSM3, and CSM4) compared to the Carburized Black Mixes (CBM1, CBM2, CBM3, CBM4) is presented in Table 2 below:

TABLE 2

| | CSM1 | CBM1 | CSM2 | CBM2 | CSM3 | CBM3 | CSM4 | CBM4 |
|---|---|---|---|---|---|---|---|---|
| Carbon(wt. %) | 1.87 | 6.12 | 9.37 | 6.12 | 9.57 | 6.11 | 7.81 | 6.09 |
| Chromium (wt. %) | 11.03 | 0.40 | 11.94 | 0.32 | 9.99 | 0.38 | 5.00 | 0.38 |
| Oxygen (wt. %) | 0.234 | 0.107 | 0.0358 | 0.1037 | 0.0591 | 0.1085 | 0.0684 | 0.1144 |

Oxidation Gain Study

Oxidation gain studies were performed comparing Carburized Sample Mix 1 (CSM1) with Carburized Black Mix 1 (CBM1) and comparing Carburized Sample Mix 2 (CSM2) with Carburized Black Mix 2 (CBM2). Six samples of each were placed in a furnace at 600 degrees Celsius. One sample of each was taken out and tested each hour for a total of six hours. Data comparing Carburized Black Mix 1 (CBM1) and Carburized Sample Mix 1 (CSM1) is found in in Table 3 below:

TABLE 3

| | Hours in Oven, g | Crucible, g | Crucible + Sample, g | Oxidized Sample + Crucible, g | Sample Weight, g | Oxidized Sample Weight, g | Gain in oxidation | |
|---|---|---|---|---|---|---|---|---|
| | | | | | | | g | % |
| CSM1-1 | 0.95 | 47.03 | 53.479 | 54.416 | 6.449 | 7.386 | 0.937 | 14.53 |
| CSM1-2 | 1.93 | 47.019 | 53.306 | 54.229 | 6.287 | 7.21 | 0.923 | 14.68 |
| CSM1-3 | 3.08 | 46.019 | 51.986 | 52.763 | 5.967 | 6.744 | 0.777 | 13.02 |
| CSM1-4 | 4.00 | 46.944 | 51.457 | 52.085 | 4.513 | 5.141 | 0.628 | 13.92 |
| CSM1-5 | 5.02 | 52.05 | 58.046 | 58.840 | 5.996 | 6.79 | 0.794 | 13.24 |
| CSM1-6 | 6.02 | 45.118 | 50.983 | 51.601 | 5.865 | 6.483 | 0.618 | 10.54 |
| CBM1-1 | 0.95 | 47.08 | 55.155 | 56.646 | 8.075 | 9.566 | 1.491 | 18.46 |
| CBM1-2 | 1.93 | 47.26 | 54.473 | 55.805 | 7.213 | 8.545 | 1.332 | 18.47 |
| CBM1-3 | 3.08 | 47.511 | 58.291 | 60.284 | 10.78 | 12.773 | 1.993 | 18.49 |
| CBM1-4 | 4.00 | 47.068 | 53.126 | 54.241 | 6.058 | 7.173 | 1.115 | 18.41 |
| CBM1-5 | 5.02 | 46.963 | 52.045 | 52.981 | 5.082 | 6.018 | 0.936 | 18.42 |
| CBM1-6 | 6.02 | 47.555 | 52.705 | 53.655 | 5.15 | 6.1 | 0.95 | 18.45 |

This data is also shown graphically in FIG. 1 where (W,Cr)C refers to Carburized Sample Mix 1 (CSM1) and CBM1 is carburized black mix 1 (CBM1). As shown in FIG. 1, oxidation gain for the Carburized Sample Mix 1 (CSM1) is as much as 44% lower than that of Carburized Black Mix 1 (CBM1).

Figure 2:
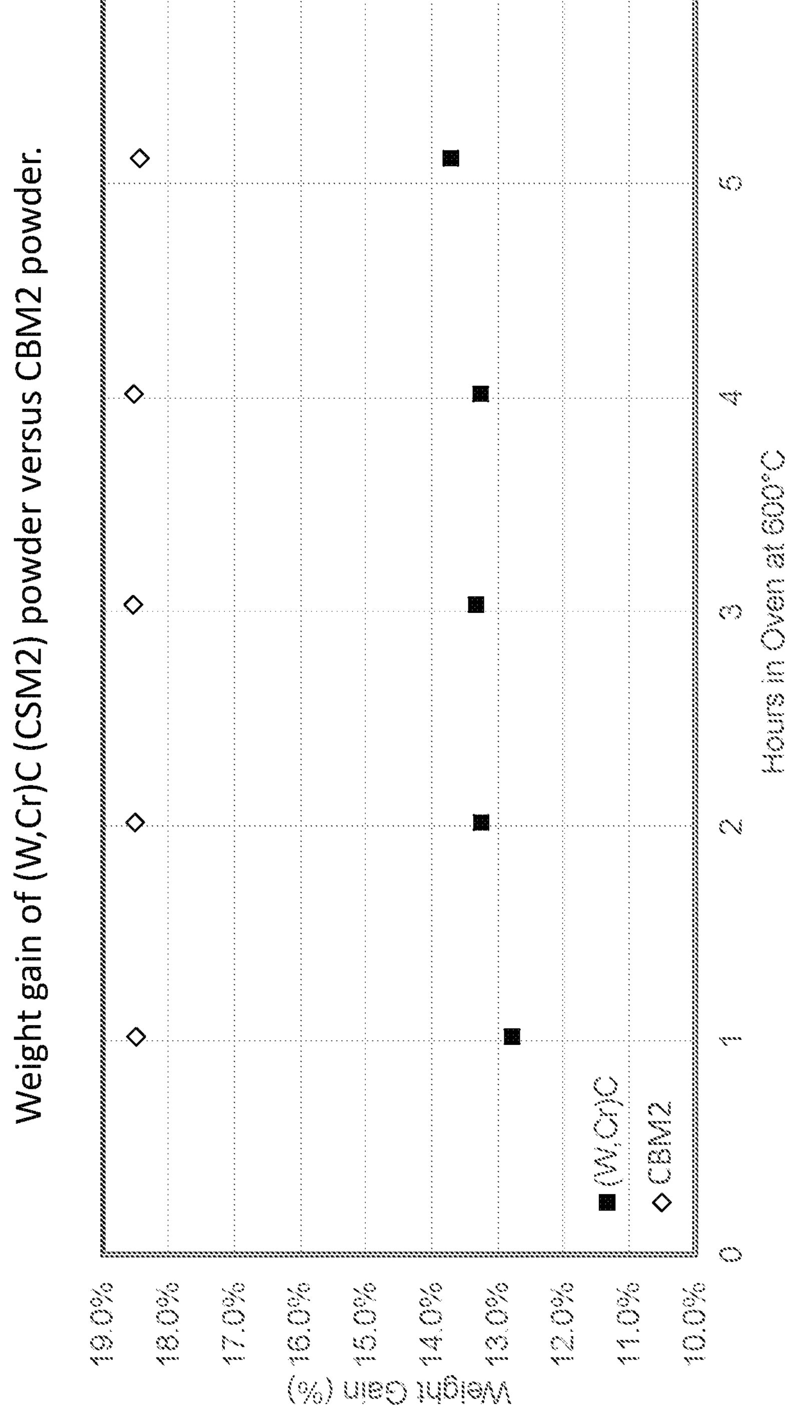
FIG. 2 is a graph showing weight gain (%) over a period of 6 hours in a 600° C. oven for certain embodiments described herein. CSM2 compared to CBM2.

Data comparing Carburized Black Mix 2 (CBM2) and Carburized Sample Mix 2 (CSM2) is found in FIG. 2, where (W,Cr)C refers to Carburized Sample Mix 2 (CSM2), and CBM2 is Carburized Black Mix 2 (CBM2). As shown in FIG. 2, oxidation gain for the Carburized Sample Mix 2 (CSM2) is as much as about 30% lower than that of Carburized Black Mix 2 (CBM2).

Figure 3:
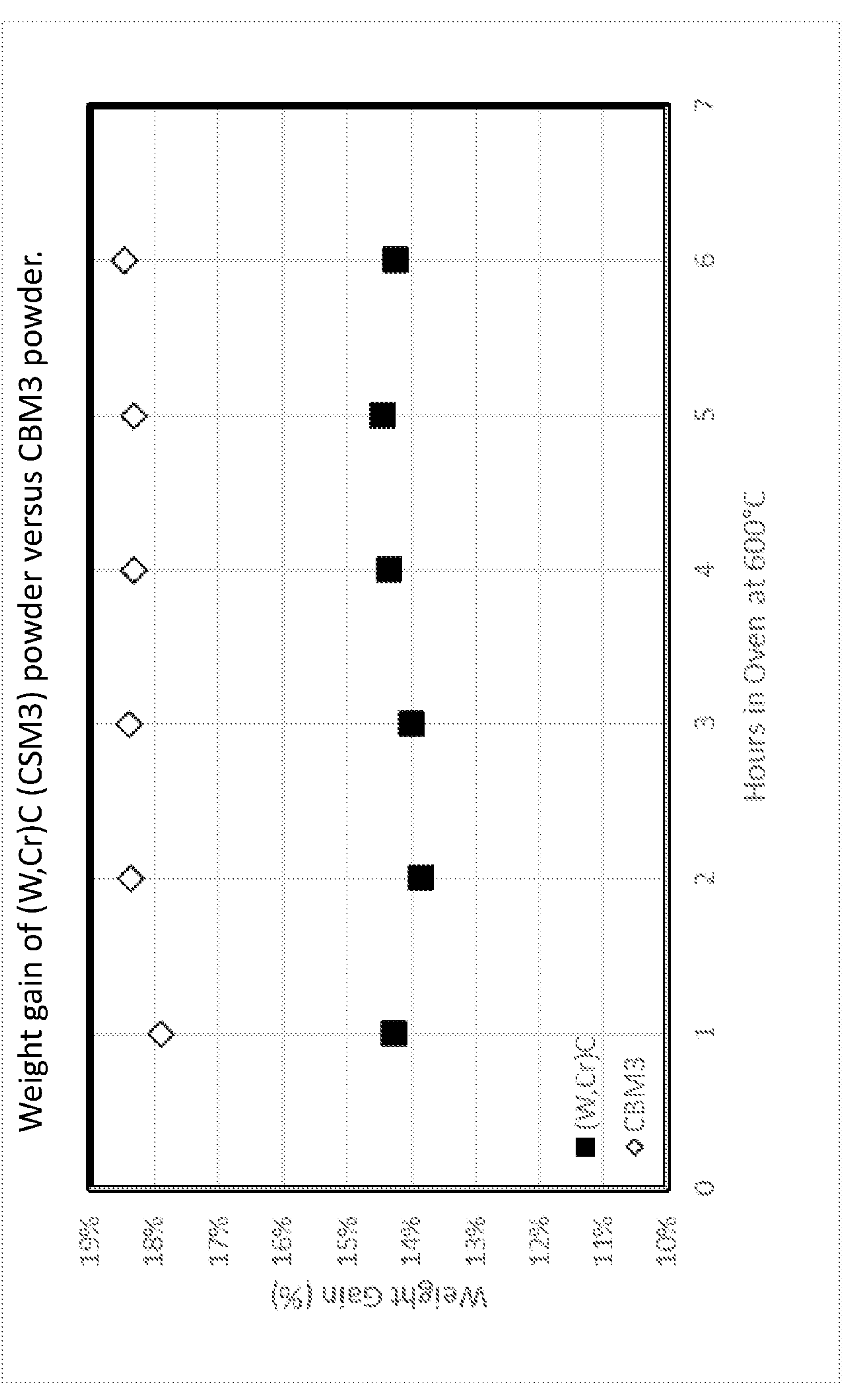
FIG. 3 is a graph showing weight gain (%) over a period of 6 hours in a 600° C. oven for certain embodiments described herein. CSM3 compared to CBM3.

Data comparing Carburized Black Mix 3 (CBM3) and Carburized Sample Mix 3 (CSM3) is found in FIG. 3, where (W,Cr)C refers to Carburized Sample Mix 3 (CSM3), and CBM3 is Carburized Black Mix 3 (CBM3). As shown in FIG. 3, oxidation gain for the Carburized Sample Mix 3 (CSM3) is as much as about 25% lower than that of Carburized Black Mix 3 (CBM3).

Figure 4:
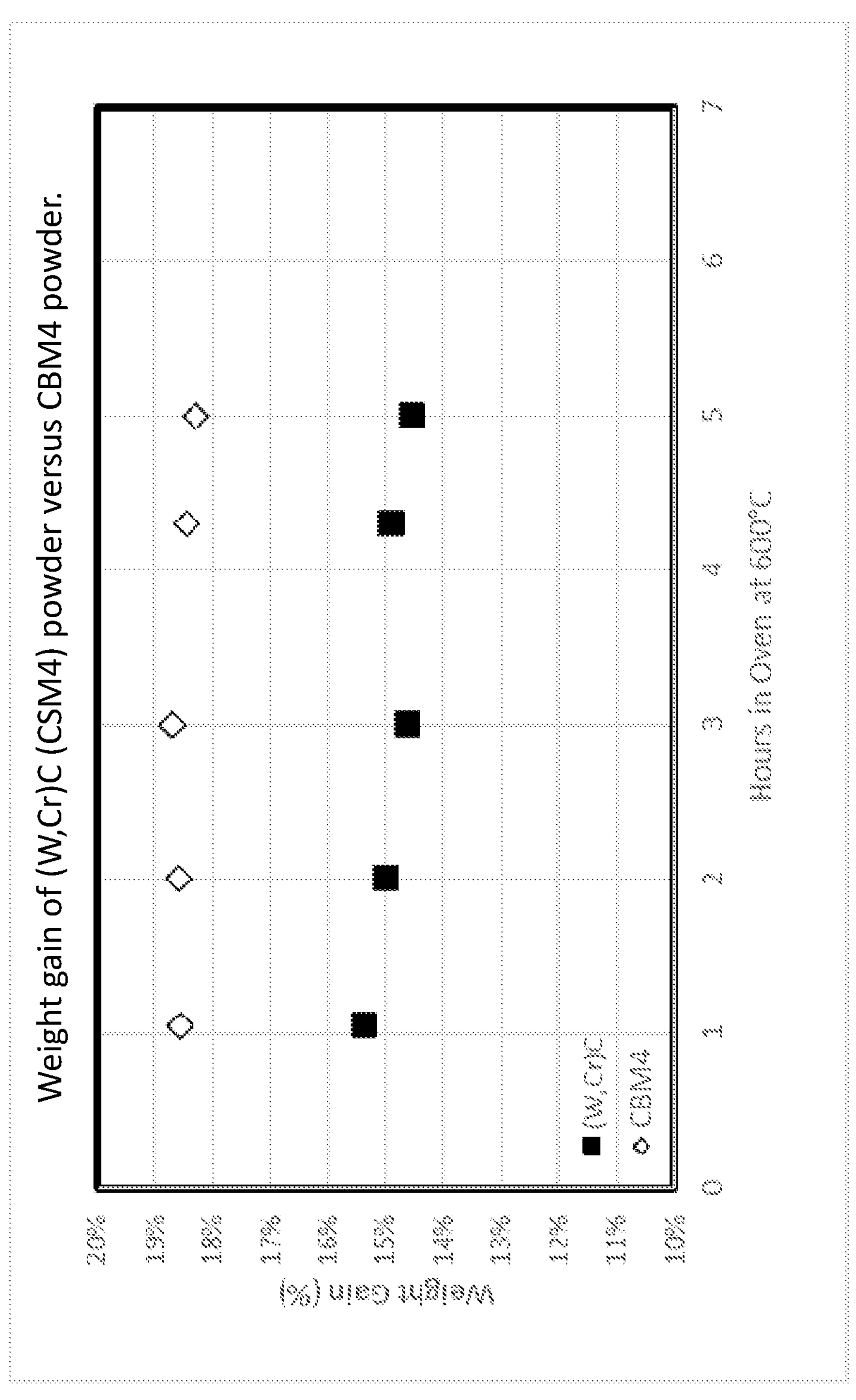
FIG. 4 is a graph showing weight gain (%) over a period of 6 hours in a 600° C. oven for certain embodiments described herein. CSM4 compared to CBM4.

Data comparing Carburized Black Mix 4 (CBM4) and Carburized Sample Mix 4 (CSM4) is found in FIG. 4, where (W,Cr)C refers to Carburized Sample Mix 4 (CSM4), and CBM4 is Carburized Black Mix 4 (CBM4). As shown in FIG. 4, oxidation gain for the Carburized Sample Mix 4 (CSM4) is as much as about 21% lower than that of Carburized Black Mix 4 (CBM4).

Overnight Oxidation Study

An overnight oxidation study was also performed for Carburized Sample Mix 1 (CSM1). Six samples of each were weighed into crucibles and placed into an oven at 850° C. The samples were removed after 24 hours of treatment, cooled, and weighed. The resulting mass gained was compared to the initial mass of the sample as a percentage. Data from this experiment is found in Table 4 below.

TABLE 4

| | Crucible weight, g | Sample weight, g | Oxidized sample + crucible, g | Oxidized Sample Weight, g | Gain in Oxidation | |
|---|---|---|---|---|---|---|
| | | | | | g | % |
| CSM1-1-24 | 46.1674 | 5.2883 | 52.434 | 6.2666 | 0.9783 | 18.50 |
| CSM1-2-24 | 48.7217 | 4.7447 | 54.624 | 5.9023 | 1.1576 | 24.40 |
| CSM1-3-24 | 47.4239 | 4.6982 | 53.336 | 5.9121 | 1.2139 | 25.84 |
| CSM1-4-24 | 45.9726 | 5.479 | 52.887 | 6.9144 | 1.4354 | 26.20 |
| CSM1-5-24 | 49.4597 | 5.0003 | 55.269 | 5.8093 | 0.809 | 16.18 |
| CSM1-6-24 | 42.4416 | 5.0348 | 48.331 | 5.8894 | 0.8546 | 16.97 |

Figure 5:
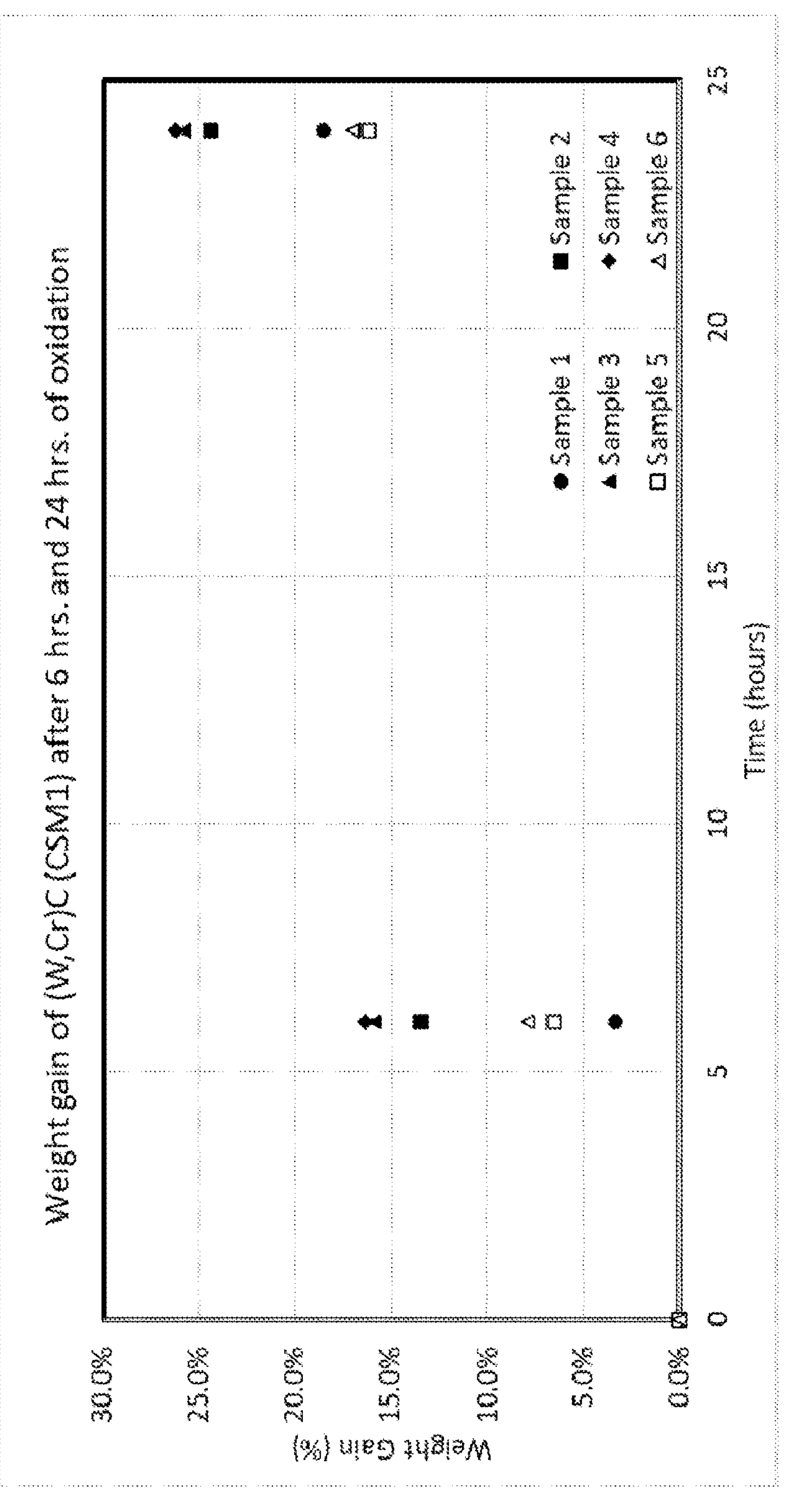
FIG. 5 is a graph showing weight gain (%) after 6 hours and 24 hours of oxidation for certain embodiments described herein.

FIG. 5 graphically depicts the gains in oxidation of the CSM1-1 to CSM1-6 from Table 3 (identified as "(W,Cr)C:6 hours") compared with gains in oxidations for samples CSM1-1-24 to CSM1-6-24 (identified as "(W,Cr)C:24 hours"). Gains in oxidation for the harsher overnight oxidation test (24 hrs.) are still low.

Figure 6:
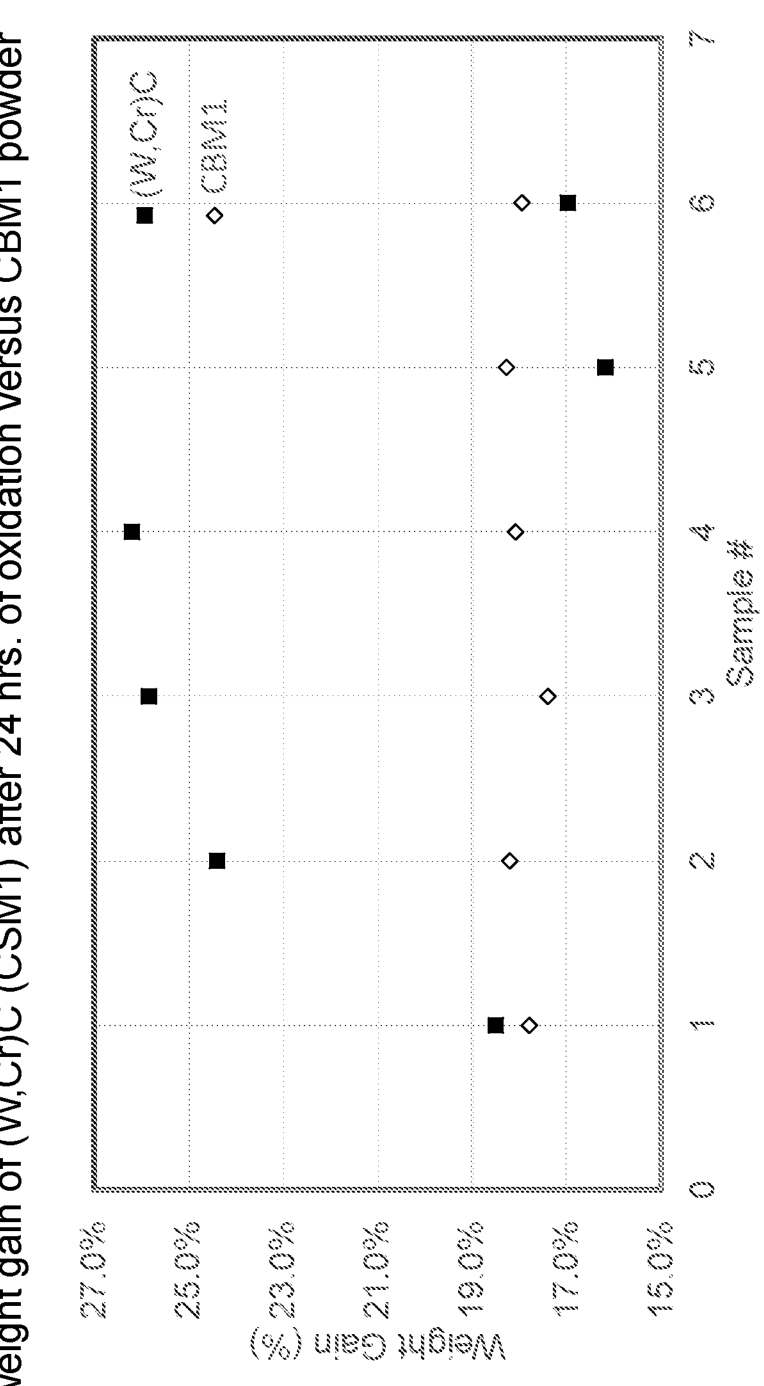
FIG. 6 is a graph showing is a graph showing weight gain (%) after 24 hours of oxidation for certain embodiments described herein. Comparing CSM1 and CBM1.

The overnight oxidation study was also performed for Carburized Black Mix 1 (CBM1), and the graph in FIG. 6 compares the weight gain (%) of CSM1 (identified as (W,Cr)C) and CBM1 (identified as CBM1).

The overnight oxidation study was also performed on Carburized Black Mix 2 (CBM2) and Carburized Sample Mix 2 (CSM2). The graph in FIG. 7 compares weight gain (%) of CSM2 (identified as (W,Cr)C) and CBM2 (identified as CBM2).

Figure 7:
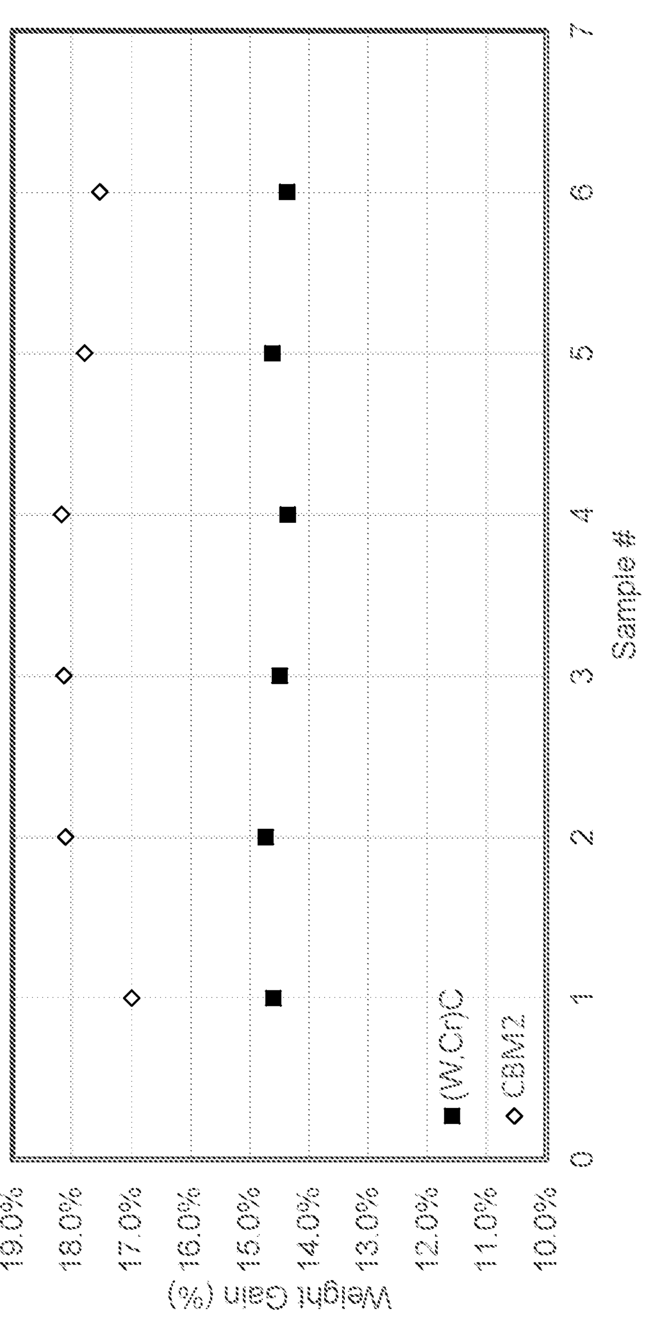
FIG. 7 is a graph showing is a graph showing weight gain (%) after 24 hours of oxidation for certain embodiments described herein. Comparing CSM2 and CBM2.

As shown in FIG. 6 and FIG. 7, oxidation for the harsher overnight oxidation test are lower for the Carburized Sample Mixes (e.g., CSM1 and CSM2) compared to the Carburized Black Mixes (e.g., CBM1 and CBM2). Sample 1 to 4 show higher oxidation than corresponding CBM1 sample probably due to the relatively low carbon content of CSM1. Tungsten or undercarburized WC is more prone to oxidation than fully carburized WC. Extremely low carbon content of CSM1 also makes it difficult to produce homogenously carburized particles which may explain the inconsistent oxidation behavior of CSM1 after 24 hours in FIG. 6. Conversely CSM2 has a higher carbon content with lower and more consistent oxidation weight gain (FIG. 7) than CSM1. This underscores the importance of carbon content in addition to Cr content in oxidation resistance of WC.

Ready-to-Press (RTP) Powders

Carburized Sample Mix 4 (CSM4) powder is then be mixed with Co or Ni using established milling and spray drying processes to make ready-to-press (RTP) powders for component manufacture. Formulation Mix for the RTP powders are shown in Table 5 below:

TABLE 5

| | | RTP1 | RTP2 |
|---|---|---|---|
| Formulation Mix | (W, Cr)C | CSM4 | CSM4 |
| | W(wt. %) | balance | balance |
| | Ni (wt. %) | 5.94 | 9.90 |
| | Cr (wt. %) | 4.65 | 4.46 |
| | Total carbon (wt. %) | 7.27 | 6.96 |
| | Wax (wt. %) | 1.00 | 1.00 |

A control batch, GU-108572, was also formed. The formulation mix for the control batch is shown in Table 6 below:

| | | GU-108572/Control |
|---|---|---|
| Formulation Mix | W(wt. %) | balance |
| | Ni (wt. %) | 6.16 |
| | Cr (wt. %) | 0.04 |
| | VC (wt. %) | 0.14 |
| | Total carbon (wt. %) | 5.75 |
| | Wax (wt. %) | 2.10 |

Figure 8:
FIG. 8 depicts sintered hardmetal parts oxidized in air at 850° C. for 24 hrs.

FIG. 8 includes depictions of sintered hard metal parts made from GU-108572 RTP1, and RTP2, respectively, that have been oxidized in air at 850° C. for 24 hours. Weight gain of GU-108753 was 18.92%. Weight gain of RTP1 was 16.36%. Weight gain of RTP2 was 17.03%.

Table 7 below includes sintered properties for parts made using RTP1, RTP2, and GU-108572 under the following sintering conditions: 1475° C. for 90 minutes, vacuum sintering.

TABLE 7

| | | RTP1 | RTP2 | GU-108572 |
|---|---|---|---|---|
| Sintered | HRA | 88.50 | 86.10 | 90.76 |
| Properties | Density g/cm$^3$ | 12.05 | 11.57 | 14.94 |
| | Porosity (ASTM B276) | A08B00-10C00 | A08B00-10C00 | A08B00-10C00 |
| | Shrinkage (%) | 14.70 | 13.20 | 17.40 |

The component manufactured using the ready-to-press (RTP) powders can be a seal for a liquid battery cell as shown in FIG. 13.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A tungsten carbide powder comprising a (W,Cr)C solid-solution phase, comprising at least 5 wt. % chromium based on the total weight of the powder.

2. The tungsten carbide powder of claim 1, comprising at least 10 wt. % chromium based on total weight of the powder.

3. The tungsten carbide powder of claim 1 having an average grain size of 0.4 μm to 10 μm.

4. The tungsten carbide powder of claim 1, wherein carbon is present in an amount of 1-10 weight percent of the powder.

5. The tungsten carbide powder of claim 1, wherein carbon is present in an amount of 5-10 weight percent of the powder.

6. The tungsten carbide powder of claim 1 having the composition 5-15 weight percent chromium, 1-10 weight percent carbon, and the balance tungsten.

* * * * *